United States Patent [19]

Fischer et al.

[11] Patent Number: 4,796,360

[45] Date of Patent: Jan. 10, 1989

[54] MOTOR-DRIVEN CHAIN SAW WITH A SPROCKET GUIDE

[75] Inventors: Manfred Fischer, Asperg; Klaus Dussler, Weinstadt; Wilfried Linke, Winnenden; Werner Hartmann, Ostfildern, all of Fed. Rep. of Germany

[73] Assignee: Andreas Stihl, Waiblingen, Fed. Rep. of Germany

[21] Appl. No.: 114,657

[22] Filed: Oct. 29, 1987

[30] Foreign Application Priority Data

Nov. 29, 1986 [DE] Fed. Rep. of Germany ....... 3640846

[51] Int. Cl.[4] ............ B23B 57/02

[52] U.S. Cl. ............ 30/384; 83/834

[58] Field of Search ............ 30/383–385; 83/830–834, 820; 474/155, 157

[56] References Cited

FOREIGN PATENT DOCUMENTS 979333 12/1975 Canada ............ 83/830

2539445 7/1976 Fed. Rep. of Germany ........ 83/830

*Primary Examiner*—Douglas D. Watts

*Attorney, Agent, or Firm*—Walter Ottesen

[57] ABSTRACT

For motor-driven chain saws, there is the danger that the chain saw will be kicked back if the reaction forces suddenly increase intensely in response to the forward thrust. This kickback effect and the danger of accident associated therewith are intended to be reduced by means of a special configuration of the saw chain. The saw chain has drive links which have an approximately triangular shape and which engage the tooth gaps of the nose sprocket with inclined flanks. The drive links are configured to be asymetrical with respect to a partition line running between the two pivot axes of the link so that the forward flank angle is greater than the rearward flank angle referred to the partition line. The two flank angles together are greater than the opening angle of the V-shaped tooth gap of the nose sprocket. The saw chain can be configured as a low-profile chain with the spacing between the pivot axes of the cutting link being at least 10% greater than the spacing of the cutting edge to the plane containing the connecting line between the two pivot axes of the cutting link. Furthermore, the depth limiter can have an area in its upper region which is at least 4 $mm^2$.

16 Claims, 9 Drawing Sheets

MOTOR-DRIVEN CHAIN SAW WITH A SPROCKET GUIDE

FIELD OF THE INVENTION

The invention relates to a motor-driven chain saw and a guide bar and saw chain assembly therefor. The saw chain has links interconnected to provide an endless chain which runs along the periphery of the guide bar which has a nose sprocket. The links of the saw chain include cutting links each having a cutting tooth and a depth limiter as well as triangularly-shaped drive links. Each drive link is interconnected with the rest of the saw chain via two pins defining respective pivot axes. The drive links have inclined flanks for engaging tooth gaps of the nose sprocket defined by mutually adjacent ones of the teeth thereof.

BACKGROUND OF THE INVENTION

Known portable handheld motor-driven chain saws are equipped with a guide bar which extends outwardly in the front thereof and on which a continuous saw chain is journalled for movement around the periphery thereof. A nose sprocket is mounted in the front end of the guide bar for changing the direction of the saw chain as it moves around the guide bar. The saw chain includes cutting links and triangular-shaped driving links with the latter engaging tooth gaps disposed between each two mutually adjacent ones of the teeth of the nose sprocket. The inclined flanks of the triangularly-shaped drive links are thereby in contact engagement with the inclined tooth flanks which laterally limit the tooth gaps. Each of the cutting links includes a cutting tooth and a depth limiter disposed ahead of the cutting tooth and which limits the depth to which the cutting tooth can cut into the wood. When cutting into soft wood and/or when the operator of the chain saw applies a large thrust pressure, the tooth can indeed cut too deeply into the wood so that a kickback effect occurs during plunge cutting operations at the forward nose region of the guide bar. Such a sudden kickback of the chain saw presents a direct danger to the operator.

SUMMARY OF THE INVENTION

In view of the foregoing, it is an object of the invention to provide a chain saw which reduces the kickback when a thrust force is directed against the saw chain in the region of the nose sprocket and which assures a plunge cutting operation wherein kickback is reduced.

The saw chain is guided on a guide bar extending forwardly from the housing of a chain saw. The guide bar and saw chain assembly includes a guide bar having upper and lower edges and a nose sprocket rotatably mounted in the forward end thereof. The nose sprocket has a plurality of teeth and each two mutually adjacent ones of the teeth conjointly define a V-shaped tooth gap having an opening angle. A plurality of links pivotally interconnected by rivet pins or the like form an endless saw chain guided along the edges of the guide bar and on the nose sprocket. A first portion of the links are cutting links and a second portion of the links are drive links. Each one of the cutting links includes: a plate-like cutting-link body having an upwardly extending rearward portion defining a cutting tooth; and, a forward upwardly extending portion defining the depth limiter. Each one of the driving links is a triangularly-shaped plate-like body having a forward bore and a rearward bore formed therein for accommodating two of the pins to define respective pivot axes. Each of the drive links has two downwardly extending inclined flanks for engaging the tooth gaps and the drive-link body is asymmetrical with respect to a partition line drawn approximately perpendicularly to a connecting line passing through the pivot axes. One of the flanks is a forward flank which defines a forward flank angle (VFW) with the partition line and the other one of the flanks is a rearward flank which defines a rearward flank angle (HFW) with the partition line. The forward flank angle (VFW) is greater than the rearward flank angle (HFW). The forward flank angle and the rearward flank angle conjointly define an angle greater than the opening angle of the V-shaped tooth gap.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
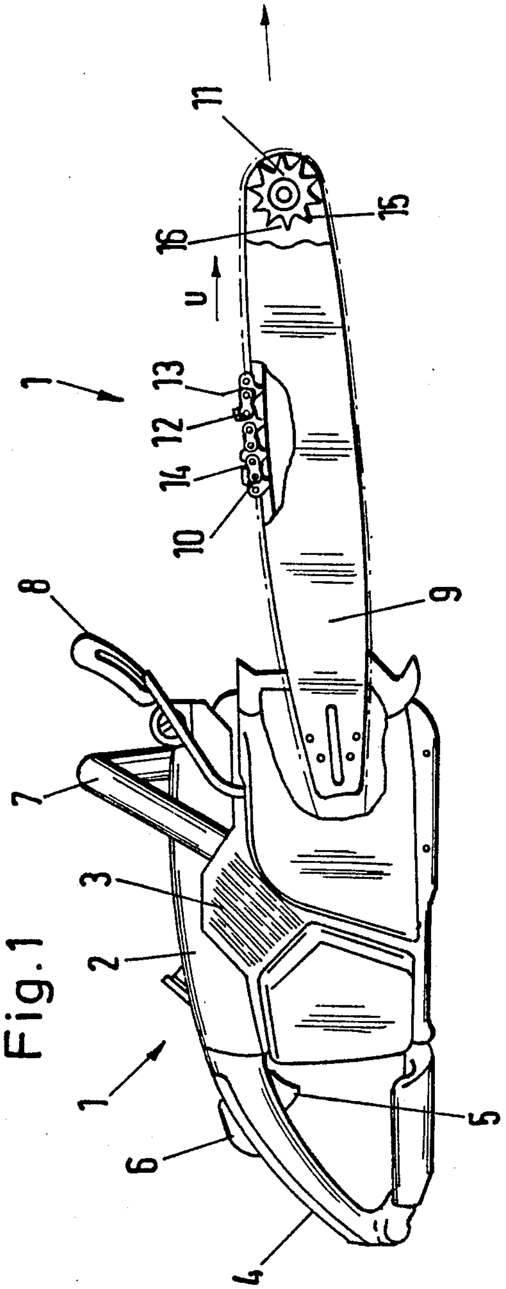
FIG. 1 is a side elevation view of a handheld portable motor-driven chain saw having a guide bar on which a continuous saw chain is guided.

The handheld motor-driven chain saw 1 includes a housing 2 containing a drive motor 3 whcih can be configured as a gasoline engine. The housing includes a rear handle 4 with a gas throttle 5 and a gas-lever latch 6. A bail handle 7 extends over the top of the housing 2 and a hand guard 8 is journalled ahead of the handle 7. Furthermore, the chain saw 1 includes a guide bar 9 extending forwardly of the housing 2. A continuous saw chain 10 is journalled on the guide bar 9 for movement about the periphery thereof. The saw chain 10 is driven by the drive motor 3 in the direction of the arrow U. A nose sprocket 11 is rotatably journalled at the forward end of the guide bar 9 for rotation about an axis and is provided to guide the saw chain 10 about the front end of the guide bar.

Figure 2:
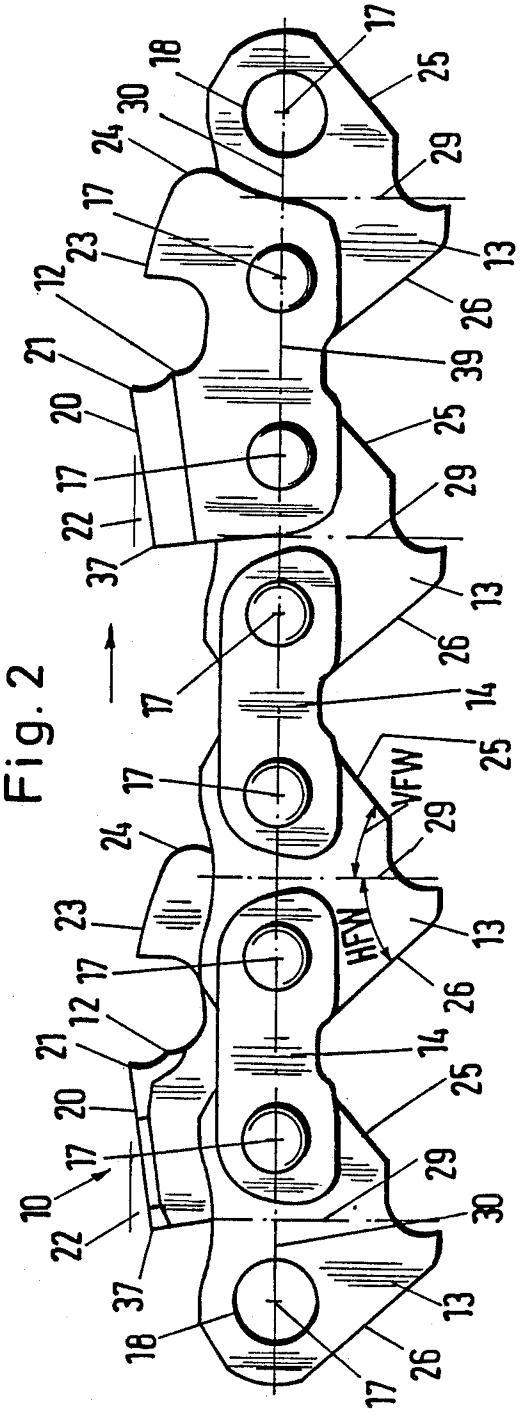
FIG. 2 is an enlarged side elevation view of the saw chain according to a preferred embodiment of the invention.
Figure 3:
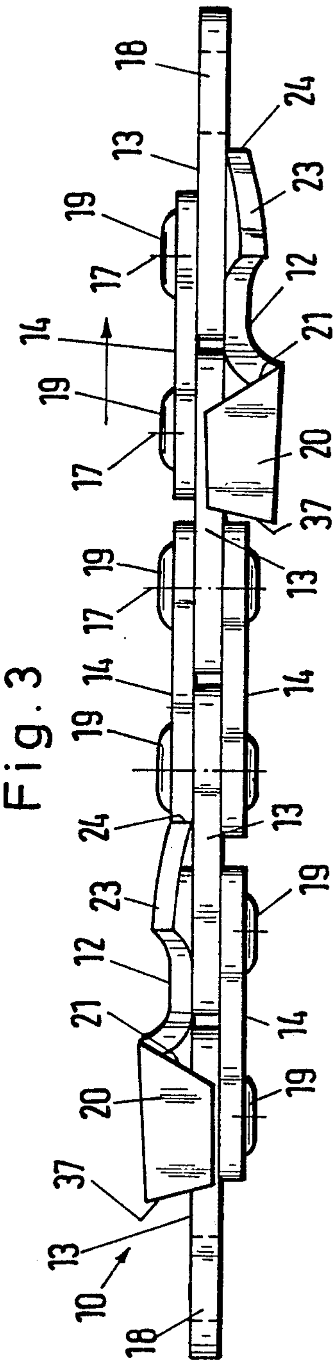
FIG. 3 is a plan view of the saw chain shown in FIG. 2.

As shown in FIGS. 2 and 3, the saw chain 10 includes cutting links 12, drive links 13 and connecting links 14 which are pivotally interconnected. The triangularly-shaped drive links 13 engage the tooth gaps 16 formed between the teeth 15 of the nose sprocket 11.

The cutting links 12 as well as the drive links 13 and connecting links 14 each have forward and rearward pivot axes 17 viewed in the direction of movement of the saw chain. Each of the cutting links 12, drive links 13 and connecting links 14 have two holes 18 formed therein for accommodating rivet pins 19 by means of which the links (12, 13, 14) are pivotally interconnected. FIGS. 2 and 3 show that the spacing between the forward pivot axis 17 and the rearward pivot axis 17 is larger for the cutting link 12 and connecting link 14 than for the drive link 13. The cutting links 12 and the connecting links 14 of this embodiment are configured as side links; whereas, the drive links 13 are so-called middle links which are journalled between two connecting links 14 or between a cutting link 12 and a connecting link 14.

The cutting link 12 has a saw tooth 20 at its rearward upper portion. The saw tooth 20 is bent over transversely to the plane of the plate-like body of the cutting link and has a forward cutting edge 21. The saw tooth 20 is inclined rearwardly starting at the cutting edge 21 so that a free angle 22 is formed. The magnitude of the free angle 22 can be approximately 6° to 8° in order to provide a high cutting capacity and nonetheless substantially eliminate the kickback effect. The preferred magnitude of the free angle 22 can be approximately 7°.

A depth limiter 23 is formed at the forward portion of the cutting link 12. The depth limiter 23 is somewhat bent over with respect to the plane of the plate-like body of the cutting link. The depth limiter 23 is disposed and spaced ahead of the cutting tooth 20 and is so configured that the rounded forward edge 24 extends to beyond and over the middle region of the drive link 13 in the direction toward the forward pivot axis 17.

The saw chain 10 of the above-described embodiment is configured as a so-called low-profile chain. That is, the spacing between the forward and rearward pivot axes 17 of the cutting link 12 along the connecting axis 39 is larger than the tooth height. For the cutting tooth 20, the tooth height is determined by the spacing of the cutting edge 21 to the connecting axis 39. The tooth roof of the cutting edge 21 is where the cutting and reaction forces act. The tooth roof also has a free angle transverse to the direction of movement of the saw chain so that the cutting edge 21 is not at the same elevation above the connecting axis 39 at every point. By tooth height is preferably meant the highest point of the edge 21 to the connecting axis 39.

The cutting tooth can also be configured differently than in the above-described embodiment. For example, the tooth roof can have a rear of increased elevation as well as other projections, recesses, chamfers or the like. The saw chain 10 is characterized as being a low-profile chain if the proportional number V of the above-mentioned spacings is the same or greater than 1.1; that is, the spacing between the forward pivot axis 17 and the rearward pivot axis 17 of the cutting link 12 is at least 1.1 times greater than the height of the cutting tooth 20 from the connecting axis 39 to the cutting edge 21.

The depth limiter 23 of the cutting link 12 is the part which limits the thickness of the chip which is cut. The depth limiter 23 has an outer or upper surface magnitude which amounts to at least 4 $mm^2$. This surface magnitude of the depth limiter 23 can be advantageously made to amount to more than 4 $mm^2$ in order to optimally limit the size of the chip and therefore also the kickback effect.

Figure 4:
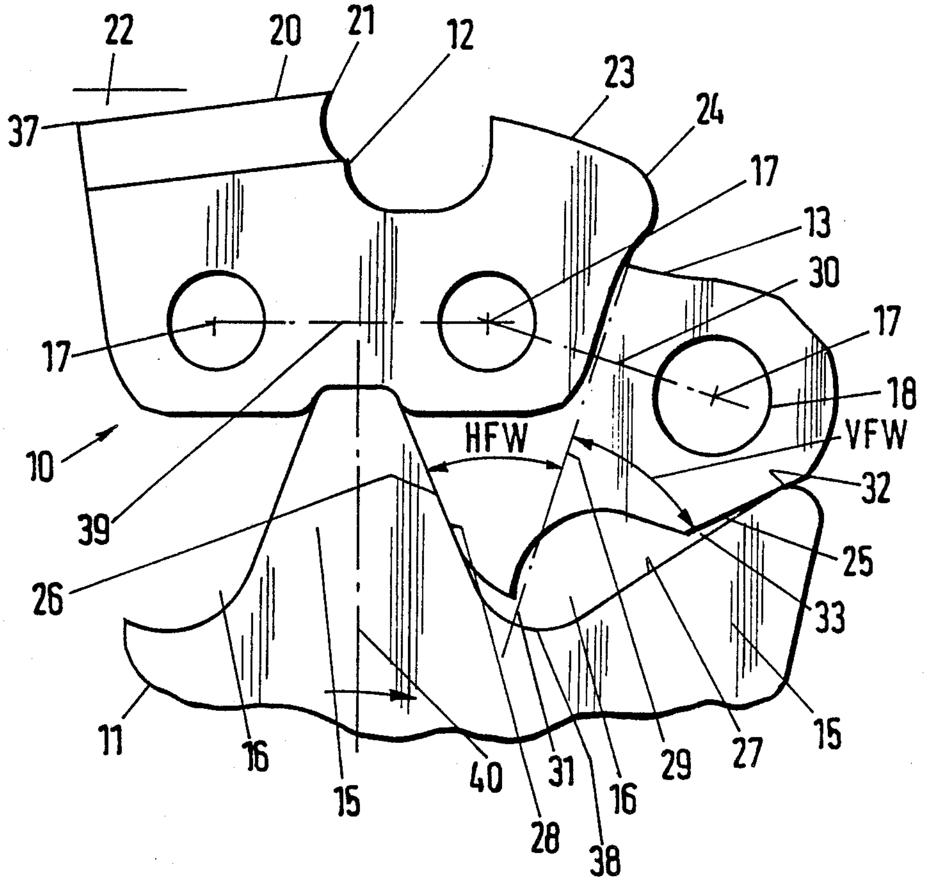
FIG. 4 shows two links of the saw chain as they enter into contact engagement with the nose sprocket.

The triangularly-shaped drive link 13 engages the tooth gap 16 of the nose sprocket 11 and has two inclined flanks 25 and 26. The flank 25 is the forward flank when viewed in the direction of movement of the saw chain and lies on the left or rearward tooth flank 27 of the forward tooth 15 (righthand tooth 15 as seen in FIG. 4); whereas, the rearward flank 26 of the drive link 13 lies against the right flank or forward tooth flank 28 of the rearward tooth 15 viewed in direction of rotation. The opening angle of the tooth gap 16 defined by the tooth flanks 27 and 28 is approximately 80° in the present embodiment. The tooth flanks 27 and 28 extend in substantially straight lines so that planar contact engaging surfaces for the drive link 13 are provided and the V-shaped tooth gap 16 is formed to have an undercut configuration.

The drive link 13 has inclined flanks 25 and 26 that are likewise configured so as to be straight and planar for a flat contact engagement with the tooth flanks 27 and 28. The drive link 13 is asymmetrically configured with reference to a partition line 29 which runs transversely to the connecting line 30 extending between the two pivot axes 17 of the drive link 13. The drive link 13 is asymmetrically configured so that the forward flank angle VFW is greater than the rearward flank angle HFW between the partition line 29 and the rearward flank 26, the flank angle VFW being between the partition line 29 and the forward flank 25.

For the drive link 13 of FIGS. 1 to 8 and 10, the partition line 29 runs between the forward and rearward pivot axes 17 and perpendicularly to connecting line 30. The forward flank angle VFW can be aproximately 1.1 to 1.4 times greater than the rearward flank angle HFW. In the present embodiment, the forward flank angle VFW is preferably approximately 1.25 times greater than the rearward flank angle HFW. In a preferred embodiment of the invention, the rearward flank angle HVW can be precisely as great as the opening angle between the angle bisecting line 31 of the tooth gap 16 and the tooth flank 28 of the tooth 15. In this way, the total angle of the asymmetrical drive link between the forward flank 25 and the rearward flank 26 is greater than the opening angle of the tooth gap 16 between the rearward tooth flank 27 and the forward tooth flank 28. In this connection, it can be especially advantageous to configure the drive link 13 so that the rearward flank angle HVW is approximately 40° and the forward flank angle VFW is approximately 50° so that the total angle between the forward flank 25 and the rearward flank 26 amounts to approximately 90° and therefore is 10° greater than the 80° opening angle of the tooth gap 16.

Figure 7:
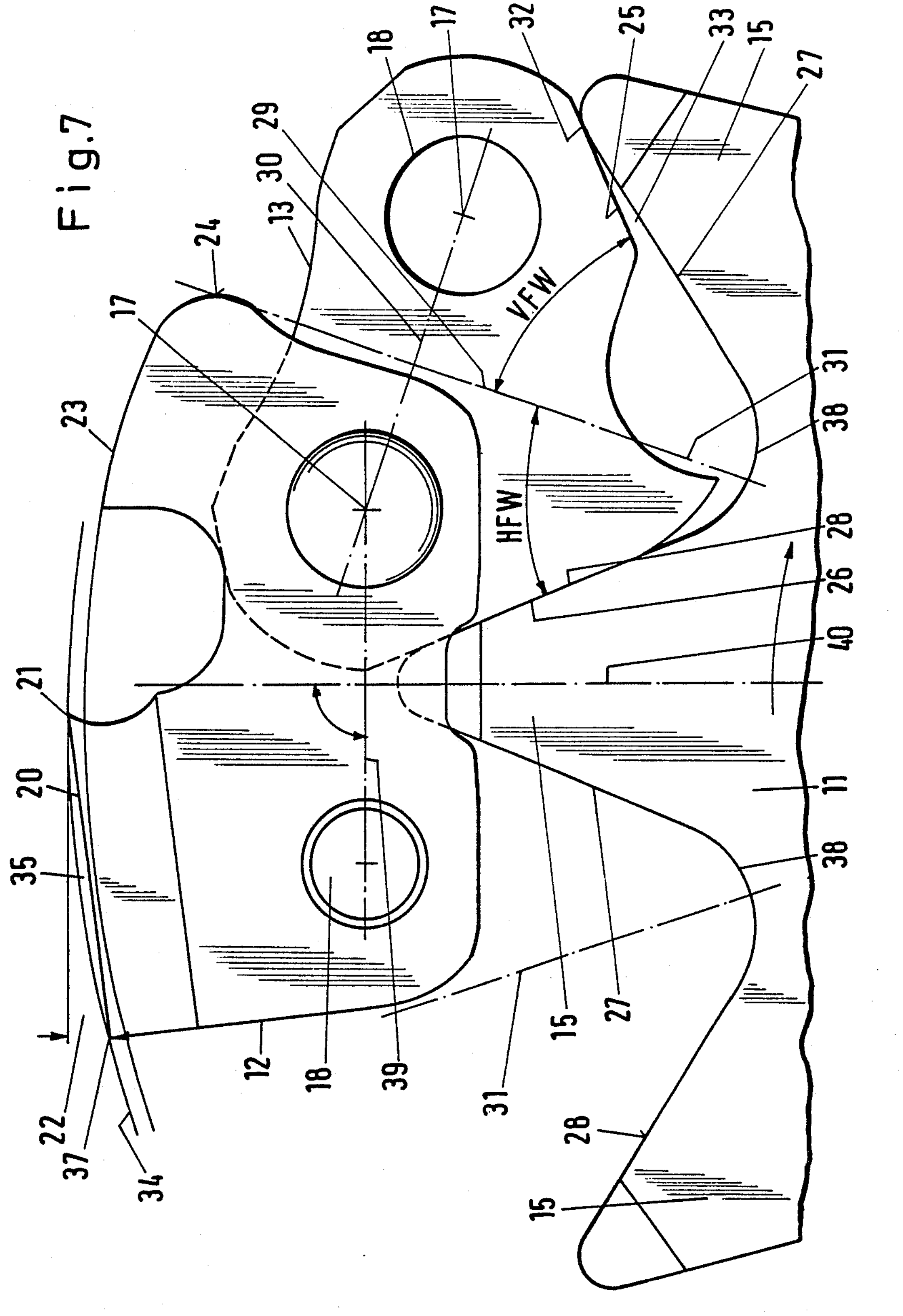
FIG. 7 is an enlarged side elevation view of a portion of the saw chain and the nose sprocket at its upper entry onto the nose sprocket similar to that shown in FIG. 4.

FIGS. 4 and 7 show the situation in which no load is applied, that is, when no substantial thrust force acts against the saw chain 10. As shown in FIGS. 4 and 7 for this situation, the drive link 13 so engages the tooth gap 16 that the partition line 29 and the angle bisecting line 31 coincide. For this condition, the rearward flank 26 (viewed in direction of movement of the saw chain) of the drive link 13 lies flush against the forward tooth flank 28 of the tooth 15 whereby a precise support is provided. In contrast, the forward flank 25 of the drive link 13 lies on an upper point 32 of the tooth flank 27 of the forward tooth 15 (when viewed in the direction of movement of the saw chain) so that it is in point or line contact engagement therewith. In this position, a free space 33 results between the forward drive link flank 25 and the tooth flank 27 which in the present embodiment can be approximately 10°, for example. In this position, the saw tooth 20 is disposed as a chord to the circle 34 traced by the cutting edge 21 because of the free angle 22 defined by the roof of the cutting tooth. In this way, a positive free angle 35 is formed between the roof of the cutting tooth 20 and the circle 34 traced by the cutting edge 21, this free angle 35 corresponding to the free angle 22.

Figure 5:
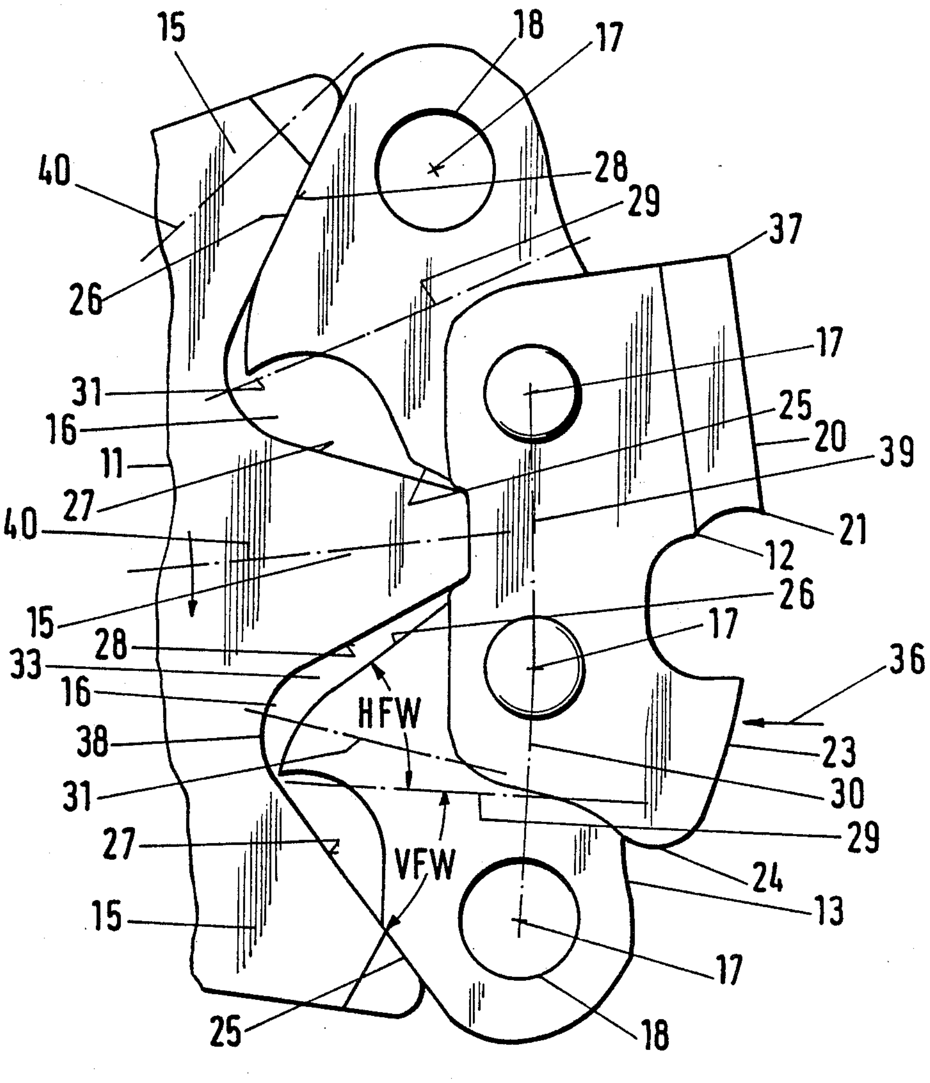
FIG. 5 is an enlarged side elevation view of three links as they appear at the forward end of the nose sprocket with a thrust force acting from outside against the saw chain as represented by an arrow.
Figure 8:
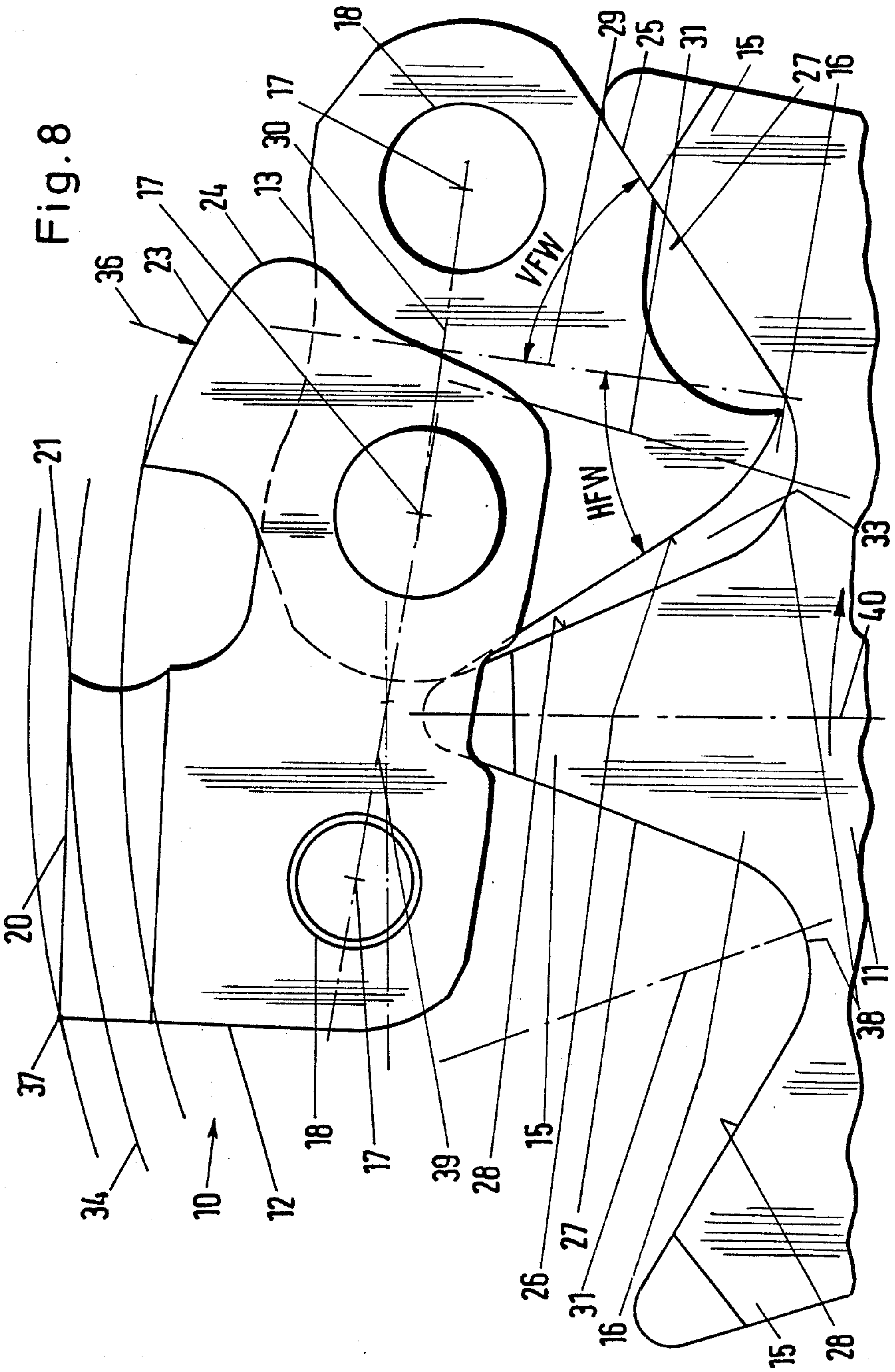
FIG. 8 is an enlarged side elevation view of the saw chain at its upper entry onto the nose sprocket corresponding to FIG. 7, however, with a thrust force acting from the outside against the saw chain.

FIGS. 5 and 8 show the situation wherein the saw chain is loaded because of the thrust force 36 acting on the saw chain 10, that is, the depth limiter 23 comes into contact engagement with the wood to be cut. The drive link 13 and therewith also the cutting link 12 have the possibility of changing position in response to the forward thrust 36 on the one hand and the special configuration of the flank angle of the drive link 13 and nose sprocket 11 on the other hand. The depth limiter 23 dives inwardly in the direction of the tooth gap 16 and the drive link 13 with the forward flank 25 (viewed in the direction of movement of the saw chain) into a flush surface contact engagement with the tooth flank 27 of the nose sprocket 11. The rearward flank 26 of the drive link 13 then braces itself by being in point contact engagement with the upper end region of the tooth flank 28 of the rearward tooth 15 when viewed from the side. The free space 33 is therefore displaced and is now between the rearward flank 26 of the drive link 13 and the forward tooth flank (right flank) 28 of the tooth 15. This change in position of the drive link 13 and of the cutting link 12 leads to an increase in elevation of the rear 37 of the cutting tooth 20 to such an extent that the rear 37 extends outwardly beyond the circle 34 traced by the cutting edge 21 as shown in FIG. 8. In this connection, it is decisive that the roof of the cutting tooth 20 now lies tangentially to the circle 34 of the cutting edge 21. The positive free angle 35 (corresponding to the free angle 22) present in the unloaded condition (FIG. 7) changes under load until a zero value is reached and can even become negative. As a consequence of the foregoing, less of the imparted energy is translated into rotational energy, that is, the kickback effect is substantially eliminated and a sudden and dangerous kickback of the guide bar 9 with the saw chain 10 is less likely to occur.

In the load condition shown in FIGS. 5 and 8, the depth limiter 23 has plummeted in the direction of the tooth gap 16 and the drive link 13 has rotated in the tooth gap 16. For this situation, the distance from the bottom 38 of the tooth gap 16 of the nose sprocket 11 to the rearward pivot axis 17 (located in the region of the rearward flank angle HVW) is less than to the forward pivot axis 17 which is located in the forward flank angle VFW of the drive link 13.

In a manner similar to FIG. 7, FIG. 4 shows the saw chain 10 entering the nose sprocket 11 without a load applied to the cutting tooth 20. The positions of the cutting link 12 and of the drive link 13 correspond to their normal positions. That is, the connecting line 30 between the two pivot axes 17 of the drive link 13 and the angle bisecting line 31 of the tooth gap 16 run perpendicular to one another. Likewise, the connecting axis 39 between the two pivot axes 17 of the cutting link 12 and the symmetrical axis 40 are likewise aligned so as to be perpendicular to one another. The angle bisecting line 31 of the tooth gap 16 and the partition line 29 of the asymmetrical drive link 13 are coincident. In this position, the drive link 13 lies with its rearward flank 26 on the forward tooth flank 28 of the rearward tooth 15 with its full length in flat contact engagement therewith. Because of the above-mentioned special angular configurations, a point contact support 32 results at the forward flank 25 of the drive link 13 and the rearward tooth flank 27 of the forward tooth 15 and a free space 33 results between the flank 25 and the tooth flank 27.

In a manner similar to FIG. 8, FIG. 5 shows the position of the cutting link 12 and of the drive link 13 with respect to the nose sprocket 11 in the case where load is applied. As soon as a kickback situation is indicated, only the depth limiter 23 is at first loaded by the wood. The cutting link 12 and the drive link 13 dive away until the drive link 13 comes into contact with its forward flank 25 on the rearward tooth flank 27 of the forward tooth 15 of the nose sprocket 11. The above-mentioned free space 33 is now formed between the rearward flank 26 of the drive link 13 and the forward tooth flank 28 of the rearward tooth 15. The diving action of the cutting link 12 and of the drive link 13 leads to an increase in elevation of the rear 37 of the cutting tooth above the circle 34 traced by the cutting edge 21. The roof of the cutting tooth 20 therefore is disposed tangentially to the circle 34 and the positive free angle 35 which is present in the unloaded condition can here reach a value of zero and even become negative. This leads to a considerable reduction of the reaction forces so that the kickback of the chain saw 1 which would otherwise be so dangerous is reduced.

The cutting link 12 and the drive link 13 remain in their dived state until the cutting edge 21 penetrates into the wood. When the cutting edge 21 has penetrated and is in engagement with the wood, reaction forces result from the occurring cutting forces. These reaction forces again erect the cutting link 12 and the drive link 13 in the opposite direction. This erecting action or repositioning is limited by the same position and magnitude of the rearward flank angle HVW and by the position and magnitude of the half opening angle of the tooth gap 16. The erecting action is only possible until the rearward flank 26 of the drive link 13 and the forward tooth flank 28 of the rearward tooth 15 of the nose sprocket 11 come into contact along their entire length.

Figure 6:
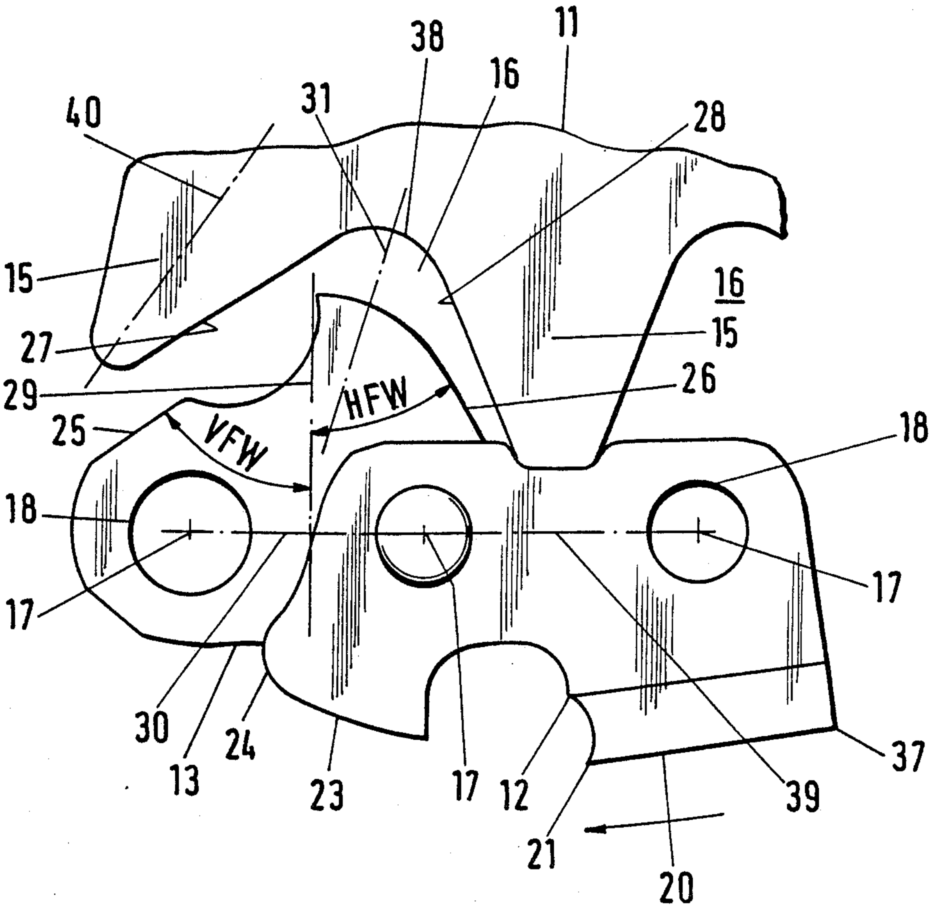
FIG. 6 is an enlarged side elevation view of a portion of the saw chain of FIGS. 1 to 3 as it runs out from the nose sprocket.

FIG. 6 shows how the cutting link 12 and the drive link 13 pass from the nose sprocket 11 into the straight line defined by the lower peripheral edge of the guide bar 9.

Figure 9:
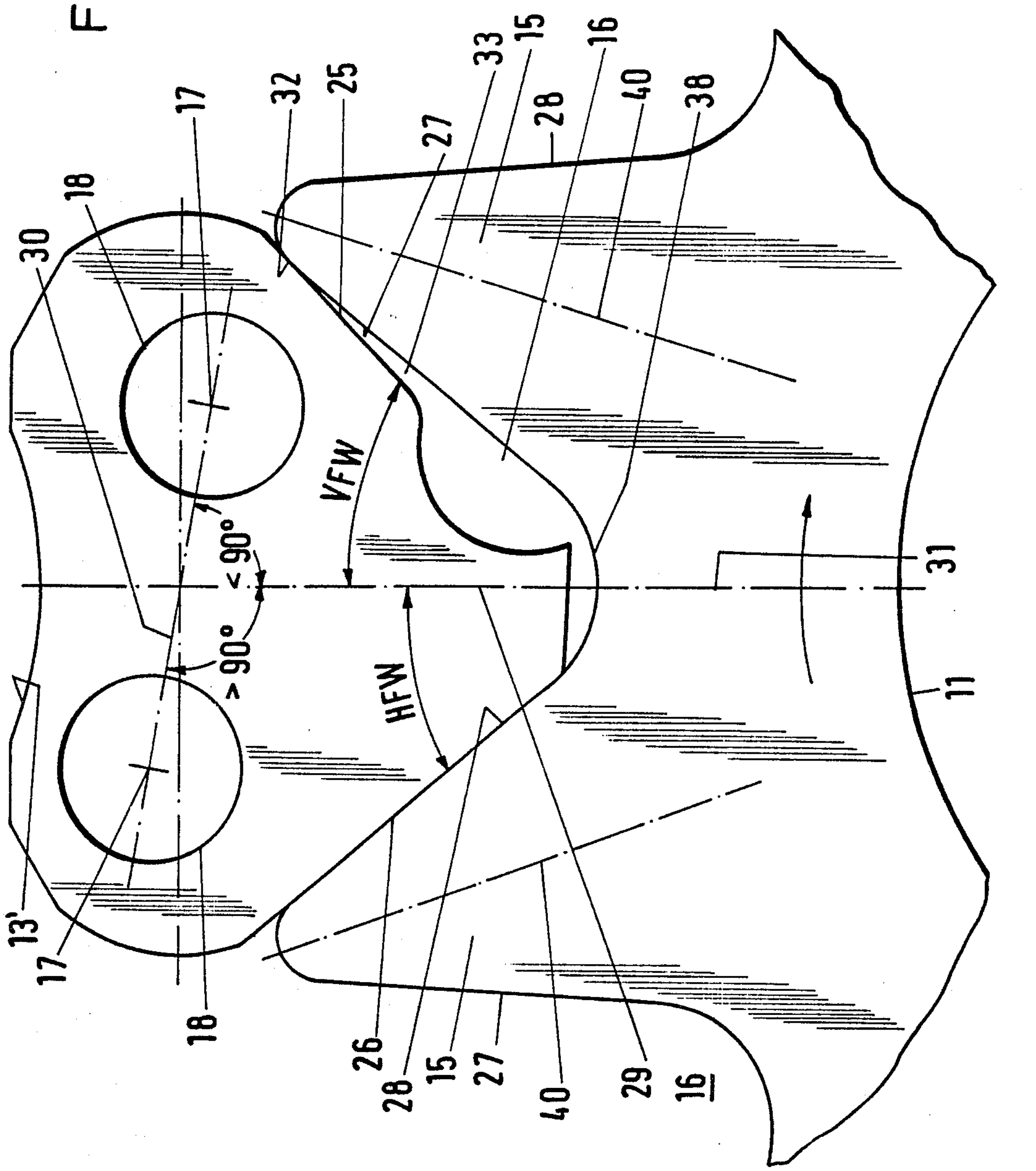
FIG. 9 is an enlarged side elevation view of the drive link of the saw chain and a portion of the nose sprocket, however, with rivet bores displaced in elevation with respect to one another; and, FIG. 10 is an enlarged side elevation view of the drive link of the saw chain and a portion of the nose sprocket similar to FIG. 9 with an additional incline on the rear flank of the drive link.

Referring to FIG. 9, the asymmetrical drive length 13' is shown engaging in the tooth gap 16 of the nose sprocket 11. In this embodiment of the invention, the asymmetrical drive link 13' of the saw chain 10 is configured so as to correspond substantially to the drive link 13 described above. However, an important difference is that the bore 18 located in the forward flank angle VFW and therefore the forward pivot axis 17 (viewed in direction of movement of the saw chain) are closer to the tooth foot 38 than the axis 17 located in the rearward tooth flank angle HVW. The two pivot axes of the drive link 13' are therefore displaced with respect to each other in elevation. In this connection, the angle between the part of the connecting line 30 which extends to the rearward pivot axis 17 and the partition line 29 is greater than 90°, the partition line 29 lying so that it is coincident with the angle bisecting line 31 for the unloaded condition of the saw chain 10. The angle formed between the partition line 29 and the part of the connecting line 30 extending to the forward pivot axis 17 is correspondingly less than 90°. The drive link 13' has a high or greatest possible stability in the end position because of this displaced arrangement of the forward and rearward pivot axes 17. The drive link position leads to an optimal position which reduces kickback for the cutting link which follows.

Figure 10:
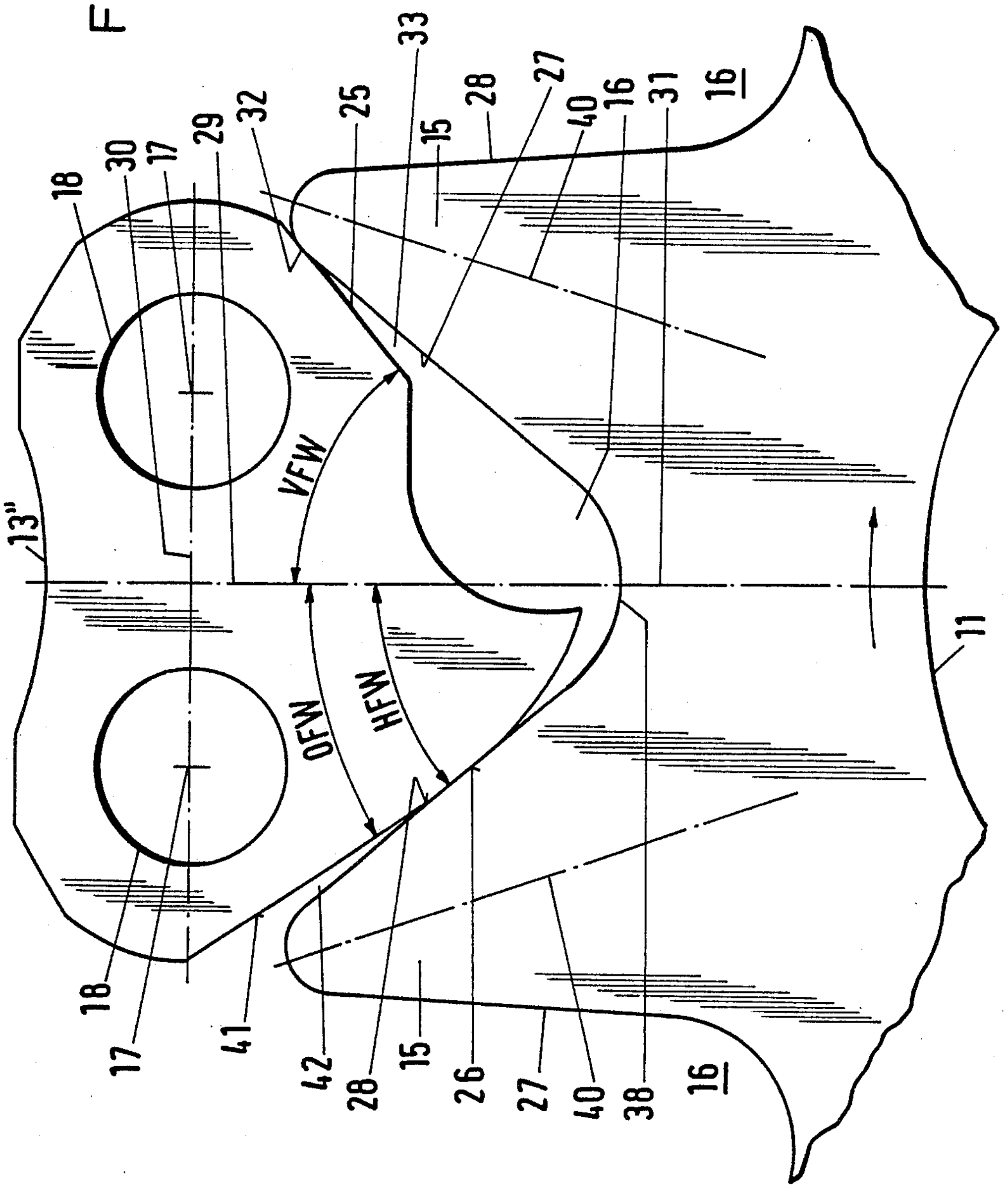

In the embodiment of FIG. 10, the drive link 13", which engages the tooth gap 16 of the nose sprocket 11, is substantially exactly asymmetrically configured as the drive link 13 described above. The partition line 29 coincides with the angle bisecting line 31 for the unloaded saw chain 10 and here extends likewise at a right angle to the connecting line 30 between the pivot axes 17. On the rearward flank 26 viewed in the direction of movement of the saw chain, the drive link 13" has additionally a chamfered flank portion 41 in the upper region. This flank portion 41 is so configured that the upper flank angle OFW is smaller than the rearward flank angle HFW, the upper flank angle OFW being between the partition line 29 and the upper flank portion 41 and the rearward flank angle HFW being in the lower region of the drive link 13". Preferably, the rearward upper flank angle portion OFW of the drive link 13" and its forward flank angle VFW together can be exactly as large as the opening angle of the tooth gap 16. In this connection, the upper flank angle portion OFW can be configured to be approximately 30°; whereas, the other previously described angle magnitudes can preferably be retained. For the unloaded saw chain 10, an angular free space 42 of approximately 10° is between the upper flank portion 41 and the tooth flank 28. By means of the additional flank portion 41, the advantage is provided that for the loaded saw chain 10, there is no longer a point-like contact at the rear of the drive link 13"; instead, a flat contact engagement is provided at the forward tooth flank 28 of the rearward (left) tooth 15. By means of this stable surface contact engagement, a possible lifting of the drive link 13" and therewith of the saw tooth because of the occurring reaction forces is made more difficult or prevented. Because of this additional stable surface contact during loading of the saw chain, a further kickback reduction is obtained which however is not only preferred for low-profile saw chains; instead, it is also very effective for normal profile and high profile chains.

The configuration according to the invention of the saw chain 10 does not affect the cutting capacity.

It is understood that the foregoing description is that of the preferred embodiments of the invention and that various changes and modifications may be made thereto without departing from the spirit and scope of the invention as defined in the appended claims.

What is claimed is:

1. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

one of said two mutually adjacent teeth being a forward tooth when viewed in the direction of the movement of said saw chain and the other one of said teeth being a rearward tooth, said rearward tooth having a forward flank and said forward tooth having a rearward flank;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including; a plate-like cutting-link body having an upwardly extending rearward portion defining a cutting tooth; and, a forward upwardly extending portion defining a depth limiter;

each one of said drive links being a triangularly-shaped plate-like body havig a forward bore and a rearward bore formed therein for accommodating two of said pins to define respective pivot axes;

each of said drive links having two downwardly extending inclined flanks for engaging said tooth gaps and said two downwardly extending inclined flanks having respective contours which extend asymmetrically with respect to a partition line drawn approximately perpendicularly to and approximately bisecting a connecting line passing through said pivot axes;

one of said inclined flanks being a forward flank which defines a forward flank angle (VFW) with said partition line and is in contact engagement with said forward flank of said rearward tooth; the other one of said inclined flanks being a rearward flank which defines a rearward flank angle (HFW) with said partition line and is in contact engagement with said rearward flank of said forward tooth; and, said forward flank angle (VFW) being greater than said rearward flank angle (HFW); and, said forward flank angle and said rearward flank angle conjointly defining an angle greater than said opening angle.

2. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap havig an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, said saw chain is a low-profile saw chain and wherein each of said plate-like cutting-link bodies having a forward bore opening for accommodating one of said rivets therein and a rearward bore opening for accommodating another one of said rivets therein, said forward and rearward bore openings defining respective bore centers located at a predetermined bore spacing from each other; and, said bore spacing being equal to or greater than 1.1 times the elevation measured from a line connecting said bore centers to said cutting tooth.

3. The guide bar and saw chain assembly of claim 2, said depth limiter of said cutting link having an upper surface having an area of at least 4 $mm^2$.

4. The guide bar and saw chain assembly of claim 1, each of the two mutually adjacent teeth of said nose sprocket having mutually adjacent tooth flanks conjointly defining said V-shaped tooth gap, said tooth flanks being configured so as to cause said tooth gap to be without undercuts.

5. The guide bar and saw chain assembly of claim 1, said forward flank angle (VFW) being approximately 1.1 to 1.4 times greater than said rearward flank angle HFW.

6. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, said forward flank angle (VFW) being approximately 1.25 times greater than said rearward flank angle HFW.

7. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, said rearward flank angle (HFW) being equal to half of said opening angle of said tooth gap.

8. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, said rearward flank angle (HFW) being approximately 40; said forward flank angle (VFW) being approximately 50°; and, said opening angle of said tooth gap being approximately 80°.

9. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, one of said two mutually adjacent teeth being a forward tooth when viewed in the direction of the movement of said saw chain and the other one of said teeth being a rearward tooth, the tips of said teeth defining a tooth circle; said forward flank angle (VFW), said rearward flank angle (HFW) and said opening angle all being configured so as to cause said rearward flank of said drive link to be in flush surface contact engagement with said forward flank of said rearward tooth when no external load is applied to said saw chain and so as to cause said forward flank of said drive link and said rearward flank of said forward tooth to conjointly define an angularly-shaped free space therebetween also in the absence of said external load, said forward flank of said drive link being in point contact engagement with said forward tooth at the upper region thereof near said tooth circle.

10. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, one of said two mutually adjacent teeth being a forward tooth when viewed in the direction of the movement of said saw chain and the other one of said teeth being a rearward tooth, the tips of said teeth defining a tooth circle; said forward flank angle (VFW), said rearward flank angle (HFW) and said opening angle all being configured so as to cause the forward flank of said rearward tooth and said rearward flank of drive link to conjointly define an angularly-shaped free space therebetween with said rearward flank of said drive link being in point contact engagement with said rearward tooth in the upper region thereof near said tooth circle in response to an external load being applied to said saw chain and so as to cause said forward flank of said drive link to be in flush surface contact engagement with the rearward tooth flank of said forward tooth also in response to said load.

11. The guide bar and saw chain assembly of claim 2, wherein said tooth gap has a tooth foot and said cutting tooth has a cutting edge which traces a cutting edge circle as it moves with said nose sprocket around the forward end of said guide bar; said rearward bore lying in said rearward flank angle (HFW) and said forward bore lying in said forward flank angle (VFW); the distance from said tooth foot to the pivot axis corresponding to said rearward bore being less than the distance from said tooth foot to the pivot axis corresponding to said forward bore; the cutting links being pivotally connected directly to and behind selected ones of said driving links; each one of said cutting links being pivotally connected at its forward bore opening to the drive link corresponding thereto at the rearward bore of the latter; said forward flank angle (VFW), said rearward flank angle (HFW) and said opening angle all being configured so as to cause the rear of said cutting tooth to be in the immediate vicinity of or to project beyond said cutting edge circle in response to a load applied to the saw chain as it moves with said nose sprocket around the forward end of said guide bar.

12. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, a rearward portion of said connecting line extends toward the pivot axis corresponding to said rearward bore, said rearward portion of said connecting line and said partition line conjointly defining a first angle; and, wherein a forward portion of said connecting line extends toward the pivot axis corresponding to said forward bore, said forward portion of said connecting line and said partition line conjointly defining a second angle; said forward and rearward bores of said drive link are formed in said triangularly-shaped plate-like body so as to cause said axes to be displaced with respect to said partition line so as to cause said first angle to be greater than 90° and so as to cause said second angle to be less than 90°.

13. A guide bar and saw chain assembly for a motor-driven chain saw, the assembly comprising:

a guide bar having upper and lower edges and a nose sprocket mounted in the forward end thereof;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining a depth limiter;

each one of said drive links being a triangularly-shaped plate-like body having a forward bore and a rearward bore formed therein for accommodating two of said pins to define respective pivot axes;

each of said drive links having two downwardly extending inclined flanks for engaging said tooth gaps and said drive-link body being asymmetrical with respect to a partition line drawn approximately perpendicularly to a connecting line passing through said pivot axes;

one of said flanks being a forward flank which defines a forward flank angle (VFW) with said partition line; the other one of said flanks being a rearward flank which defines a rearward flank angle (HFW) with said partition line; and, said forward flank angle (VFW) being greater than said rearward flank angle (HFW);

said forward flank angle and said rearward flank angle conjointly defining an angle greater than said opening angle; and, said rearward flank of said drive link being subdivided into an upper flank segment and a lower flank segment; said lower flank segment and said partition line conjointly defining said rearward flank angle (HFW); and, said upper flank segment and said partition line conjointly defining an upper flank angle (OFW) and said upper segment having a slope so as to cause said upper flank angle (OFW) to be less than said rearward flank angle (HFW).

14. The guide bar and saw chain assembly of claim 13, said upper flank angle (OFW) and said forward flank angle (VFW) together being equal to said opening angle.

15. The guide bar and saw chain assembly of claim 14, one of said two mutually adjacent teeth being a rearward tooth when viewed in the direction of the movement of the saw chain, said rearward tooth having a forward flank; said upper flank segment having a slope selected so as to cause said upper flank segment to be in flush surface contact engagement with said flank of said rearward tooth in response to a load applied to said saw chain.

16. A motor-driven chain saw comprising:

a housing;

a guide bar mounted on said housing and having upper and lower edges and a nose sprocket rotatably mounted in the forward end thereof;

one of said two mutually adjacent teeth being a forward tooth when viewed in the direction of the movement of said saw chain and the other one of said teeth being a rearward tooth, said rearward tooth having a forward flank and said forward tooth having a rearward flank;

said nose sprocket having a plurality of teeth and each two mutually adjacent ones of said teeth conjointly defining a V-shaped tooth gap having an opening angle;

a plurality of links pivotally interconnected by rivet pins or the like to form an endless saw chain guided on said guide bar on said edges and on said nose sprocket;

a first portion of said links being cutting links and a second portion of said links being drive links;

each one of said cutting links including: a plate-like cutting-link body having an upwardly extending rearward portion defining a cutting tooth; and, a forward upwardly extending portion defining the depth limiter;

each one of said drive links being a triangularly-shaped plate-like body having a forward bore and rearward bore formed therein for accommodating two of said pins to define respective pivot axes;

each of said drive links having two downwardly extending inclined flanks for engaging said tooth gaps and said two downwardly extending inclined flanks having respective contours which extend asymmetrically with respect to a partition line drawn approximately perpendicularly to and approximately bisecting a connecting line passing through said pivot axes;

one of said inclined flanks being a forward flank which defines a forward flank angle (VFW) with said partition line and is in contact engagement with said forward flank of said rearward tooth; the other one of said inclined flanks being a rearward flank which defines a rearward flank angle (HFW) with said partition line and is in contact engagement with said rearward flank of said forward tooth; and, said forward flank angle (VFW) being greater than said rearward flank angle (HFW); and, said forward flank angle and said rearward flank angle conjointly defining an angle greater than said opening angle.

* * * * *